United States Patent
Janarthanam et al.

(10) Patent No.: US 12,024,339 B2
(45) Date of Patent: Jul. 2, 2024

(54) ATTACHMENT CONCEPTS FOR TRACTION BATTERY PACK ENCLOSURE ASSEMBLIES

(71) Applicant: FORD GLOBAL TECHNOLOGIES, LLC, Dearborn, MI (US)

(72) Inventors: Suriyaprakash A. Janarthanam, Canton, MI (US); Rajaram Subramanian, Ann Arbor, MI (US); Kanchana Perumalla, Troy, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 129 days.

(21) Appl. No.: 17/489,152

(22) Filed: Sep. 29, 2021

(65) Prior Publication Data

US 2023/0096902 A1     Mar. 30, 2023

(51) Int. Cl.
| | |
|---|---|
| *H01M 4/76* | (2006.01) |
| *B60K 6/28* | (2007.10) |
| *B65D 43/16* | (2006.01) |
| *H01M 50/24* | (2021.01) |
| *H01M 50/249* | (2021.01) |
| *H01M 50/262* | (2021.01) |
| *H01M 50/291* | (2021.01) |
| *B60L 50/64* | (2019.01) |

(52) U.S. Cl.
CPC ............. *B65D 43/167* (2013.01); *B60K 6/28* (2013.01); *H01M 50/24* (2021.01); *H01M 50/249* (2021.01); *H01M 50/262* (2021.01); *H01M 50/291* (2021.01); *B60L 50/64* (2019.02); *H01M 2220/20* (2013.01)

(58) Field of Classification Search
CPC ....... B65D 43/167; B60K 6/28; H01M 50/24; H01M 50/249; H01M 50/262; H01M 50/291; H01M 2220/20; B60L 50/64
See application file for complete search history.

(56) References Cited

U.S. PATENT DOCUMENTS

| | | | |
|---|---|---|---|
| 8,210,301 B2 | 7/2012 | Hashimoto et al. | |
| 8,900,744 B2 | 12/2014 | Loo et al. | |
| 9,172,071 B2 | 10/2015 | Yoshioka et al. | |
| 10,371,181 B1 * | 8/2019 | Reibling | F16B 2/02 |
| 2018/0361874 A1 * | 12/2018 | Kobayashi | H01M 50/227 |

FOREIGN PATENT DOCUMENTS

EP     2479818 B1     6/2017

OTHER PUBLICATIONS

Memory Locks. Catalogue [online]. Drum Workshop Inc., 2016 [retrieved on Aug. 8, 2023]. Retrieved from the Internet <URL: https://web.archive.org/web/20160826010459/http://store.dwdrums.com/c/dw-hardware-other_accessories_factory-accessories_parts-and-accessories_memory-locks> (Year: 2016).*

\* cited by examiner

*Primary Examiner* — Jimmy Vo
(74) *Attorney, Agent, or Firm* — David B. Kelley; Carlson, Gaskey & Olds, P.C.

(57) ABSTRACT

Electrified vehicles may be powered by traction battery packs. An exemplary traction battery pack may include an enclosure assembly having a tray and a cover. One or more hinged locking plate assemblies may be utilized to secure the cover to the tray of the enclosure assembly. The hinged locking plate assemblies may be configured to exert a clamping or compression force across an interface between the cover and the tray, thereby enhancing retention and providing a leak-proof joint.

18 Claims, 5 Drawing Sheets

ATTACHMENT CONCEPTS FOR TRACTION BATTERY PACK ENCLOSURE ASSEMBLIES

TECHNICAL FIELD

This disclosure relates generally to traction battery packs, and more particularly to hinged attachment concepts for compressing and sealing a joint interface between a cover and a tray of a traction battery pack enclosure assembly.

BACKGROUND

Electrified vehicles are selectively driven by battery powered electric machines. Conventional motor vehicles, by contrast, rely exclusively on the internal combustion engine to propel the vehicle.

A high voltage traction battery pack typically powers the electric machines and other electrical loads of electrified vehicles. The traction battery pack includes a plurality of battery cells and various other battery internal components that support electric propulsion of electrified vehicles. The battery cells and other battery internal components are typically housed within an outer enclosure assembly. A relatively large number of attachment components (e.g., fasteners) are typically required to maintain retention and establish a leak-proof joint interface between a tray and a cover the outer enclosure assembly.

SUMMARY

A traction battery pack according to an exemplary aspect of the present disclosure includes, among other things, a tray including a first peripheral flange, a cover including a second peripheral flange, and a hinged locking plate assembly arranged to retain the second peripheral flange to the first peripheral flange.

In a further non-limiting embodiment of the foregoing traction battery pack, the hinged locking plate assembly includes a first plate, a second plate, and a hinge pin configured to movably connect the second plate to the first plate.

In a further non-limiting embodiment of either of the foregoing traction battery packs, the first plate is received against a bottom surface of the first peripheral flange and the second plate is received against a top surface of the second peripheral flange.

In a further non-limiting embodiment of any of the foregoing traction battery packs, a fastener is received through the second plate, the second peripheral flange, the first peripheral flange, and the first plate. The hinged locking plate assembly is configured to apply a clamping force across an interface between the first peripheral flange and the second peripheral flange.

In a further non-limiting embodiment of any of the foregoing traction battery packs, the fastener is secured in place by a weld nut.

In a further non-limiting embodiment of any of the foregoing traction battery packs, the clamping force is applied across a seal that is positioned at the interface.

In a further non-limiting embodiment of any of the foregoing traction battery packs, the first plate and the second plate each include a flared section that is configured to accommodate a rolled edge of the first peripheral flange or the second peripheral flange.

In a further non-limiting embodiment of any of the foregoing traction battery packs, the hinged locking plate assembly includes a groove located in the vicinity of the hinge pin.

In a further non-limiting embodiment of any of the foregoing traction battery packs, a pressure plate is positioned between the second peripheral flange and the hinged locking plate assembly.

In a further non-limiting embodiment of any of the foregoing traction battery packs, the tray and the cover establish an enclosure assembly, and a battery array is housed inside the enclosure assembly.

A traction battery pack according to another exemplary aspect of the present disclosure includes, among other things, an enclosure assembly including a tray, a cover, and a hinged locking plate assembly adapted to both retain the cover to the tray and seal an interface between the cover and the tray. A battery array is housed within the enclosure assembly.

In a further non-limiting embodiment of the foregoing traction battery pack, the interface is located between a first peripheral flange of the tray and a second peripheral flange of the cover.

In a further non-limiting embodiment of either of the foregoing traction battery packs, the hinged locking plate assembly includes a first plate, a second plate, and a hinge pin configured to permit one of the first plate or the second plate to rotate relative to the other of the first plate or the second plate.

In a further non-limiting embodiment of any of the foregoing traction battery packs, the first plate is received against a bottom surface of a first peripheral flange of the tray, and the second plate is received against a top surface of a second peripheral flange of the cover.

In a further non-limiting embodiment of any of the foregoing traction battery packs, a fastener is received through the second plate, the second peripheral flange, the first peripheral flange, and the first plate. The hinged locking plate assembly is configured to apply a clamping force across the interface.

In a further non-limiting embodiment of any of the foregoing traction battery packs, the fastener is secured in place by a weld nut that is secured to the first plate.

In a further non-limiting embodiment of any of the foregoing traction battery packs, the clamping force is applied across a seal that is positioned at the interface.

In a further non-limiting embodiment of any of the foregoing traction battery packs, the first plate or the second plate includes a flared section that is configured to accommodate a rolled edge of the first peripheral flange or the second peripheral flange.

In a further non-limiting embodiment of any of the foregoing traction battery packs, the hinged locking plate assembly includes a groove located in the vicinity of the hinge pin.

In a further non-limiting embodiment of any of the foregoing traction battery packs, a pressure plate is positioned between the cover and the hinged locking plate assembly.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary traction battery pack designs for use in electrified vehicles. An exemplary traction battery pack may include an enclosure assembly having a tray and a cover. One or more hinged locking plate assemblies may be utilized to secure the cover to the tray of the enclosure assembly. The hinged locking plate assemblies may be configured to exert a clamping or compression force across an interface between the cover and the tray, thereby enhancing retention and providing a leak-proof joint. These and other features are discussed in greater detail in the following paragraphs of this detailed description.

Figure 1:
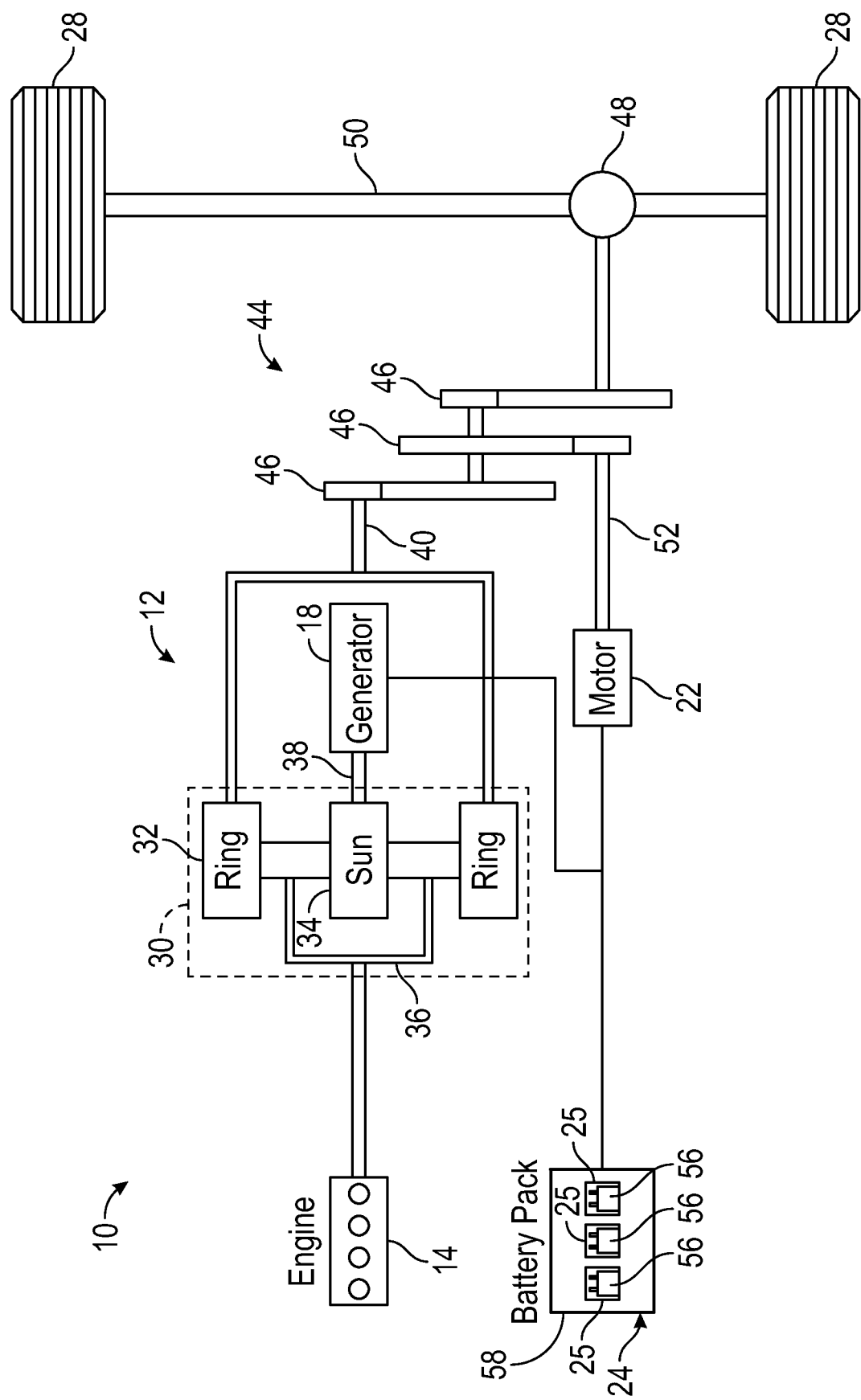
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEVs and could extend to other electrified vehicles, including, but not limited to, plug-in hybrid electric vehicles (PHEV's), battery electric vehicles (BEVs), fuel cell vehicles, etc.

In an embodiment, the powertrain 10 is a power-split powertrain system that employs first and second drive systems. The first drive system includes a combination of an engine 14 and a generator 18 (i.e., a first electric machine). The second drive system includes at least a motor 22 (i.e., a second electric machine), the generator 18, and a traction battery pack 24. In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1, this disclosure extends to any hybrid or electric vehicle including but not limited to full hybrids, parallel hybrids, series hybrids, mild hybrids, or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In an embodiment, the power transfer unit 30 is a planetary gear set that includes a ring gear 32, a sun gear 34, and a carrier assembly 36.

The generator 18 may be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In an embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the traction battery pack 24.

The traction battery pack 24 is an exemplary electrified vehicle traction battery. The traction battery pack 24 may be a high voltage traction battery pack that includes one or more battery arrays 25 (i.e., battery assemblies or groupings of battery cells 56) capable of outputting electrical power to operate the motor 22, the generator 18, and/or other electrical loads of the electrified vehicle 12 for providing power to propel the wheels 28. Other types of energy storage devices and/or output devices could also be used to electrically power the electrified vehicle 12.

The total number of battery arrays 25 and battery cells 56 provided within the traction battery pack 24 is not intended to limit this disclosure. In an embodiment, the battery cells 56 of each battery array 25 are prismatic, lithium-ion cells. However, battery cells having other geometries (cylindrical, pouch, etc.), other chemistries (nickel-metal hydride, lead-acid, etc.), or both could alternatively be utilized within the scope of this disclosure.

The battery arrays 25 and any other battery internal components (e.g., battery electronics, wiring, connectors, etc.) of the traction battery pack 24 may be housed within an enclosure assembly 58, which establishes the outermost surfaces of the traction battery pack 24. The components of the enclosure assembly 58 must be retained and sealed in a leak-free manner in order for the traction battery pack 24 to function properly. Achieving retention and sealing between the battery enclosure components can be difficult due to factors such as battery component tolerance stack up, dimensional variances, misalignment of attachment openings, and other assembly issues. This disclosure is therefore directed to improved devices for retaining and sealing traction battery pack enclosures.

Figure 2:
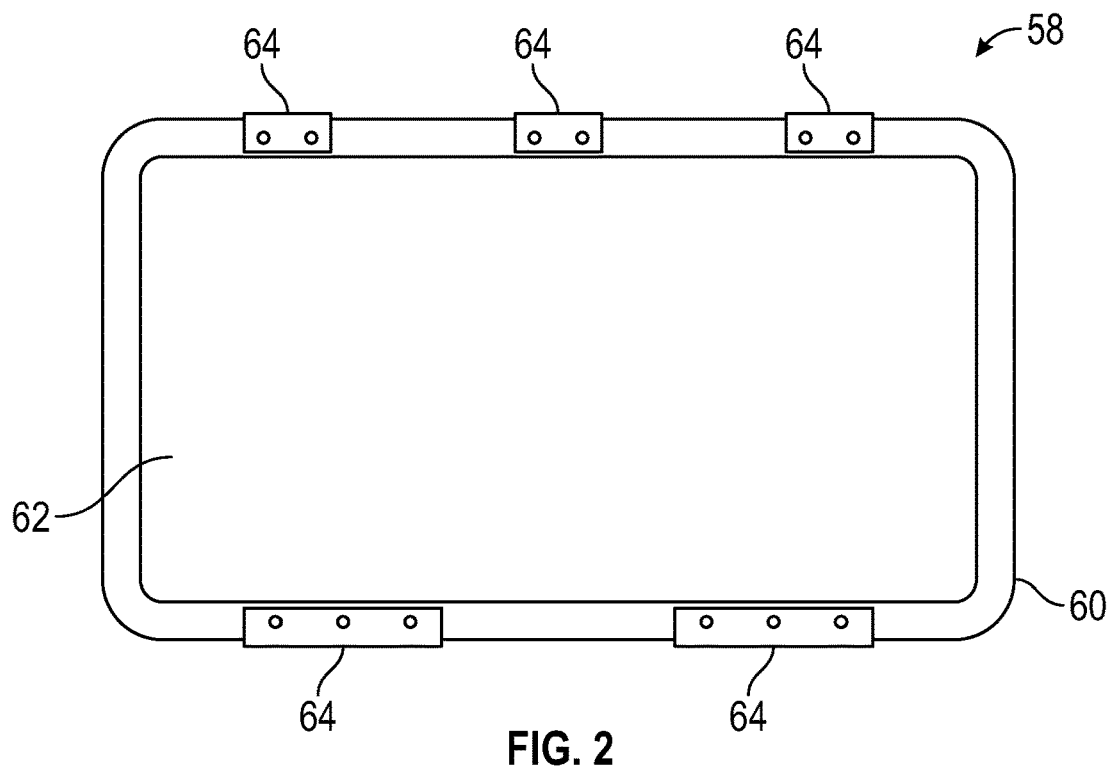
FIG. 2 is a top view of an enclosure assembly of a traction battery pack of an electrified vehicle.
Figure 3:
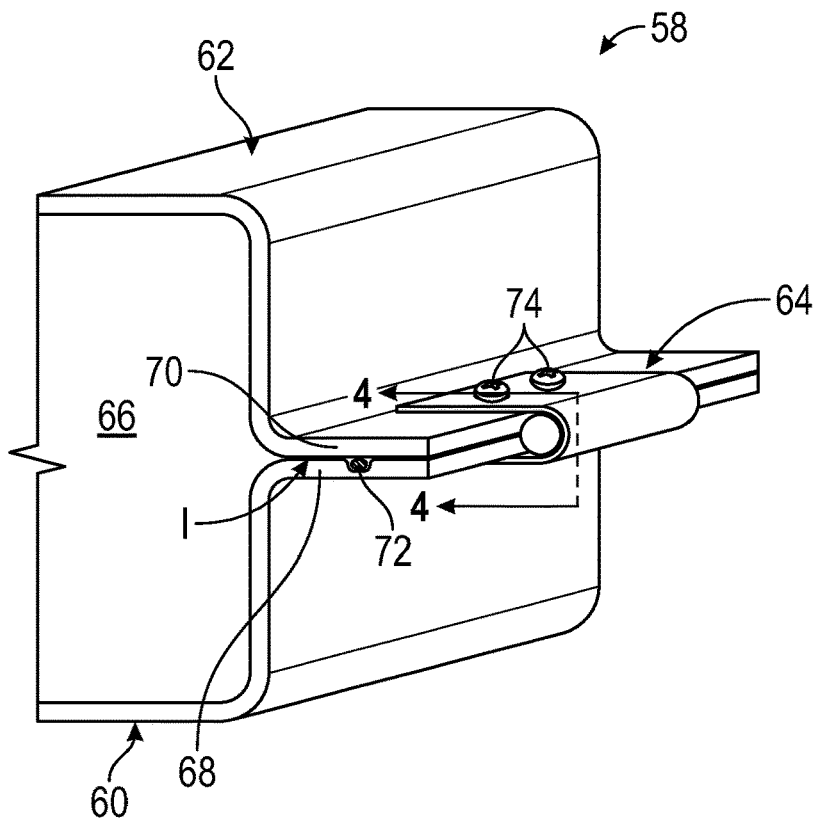
FIG. 3 is a partial perspective view of the enclosure assembly of FIG. 2.

FIGS. 2 and 3 illustrate an exemplary enclosure assembly 58 of a traction battery pack, such as the traction battery pack 24 of FIG. 1, for example. FIG. 2 is a top view of the enclosure assembly 58, and FIG. 3 is a partial perspective view of select portions of the enclosure assembly 58.

The enclosure assembly 58 may include a tray 60, a lid or cover 62, and one or more hinged locking plate assemblies 64. In the exemplary embodiment of FIG. 2, a total of five hinged locking plate assemblies 64 are included as part of the enclosure assembly 58. However, a greater or fewer number of hinged locking plate assemblies 64 may be provided within the scope of this disclosure. As is further detailed below, the hinged locking plate assemblies 64 may be configured for retaining the cover 62 to the tray 60 and for maintaining a leak-proof joint at an interface I between the tray 60 and the cover 62.

The tray 60 and the cover 62 of the enclosure assembly 58 may embody any size, shape, and material configuration within the scope of this disclosure. For example, the tray 60 and/or cover 62 could be rectangular, triangular, round, irregular, etc. The tray 60 and the cover 62 may be constructed of metallic materials, polymer-based materials, textile materials, or any combination of these materials. In other embodiments, the tray 60 includes a different shape and material makeup than the cover 62.

The enclosure assembly 58 may provide an open area 66 (see FIG. 3) for holding battery arrays and other battery internal components (not shown in FIG. 3 for simplicity) of the traction battery pack 24. The open area 66 may be established by inner walls/surfaces of both the tray 60 and the cover 62.

The interface I may extend between a peripheral flange 68 of the tray 60 and a peripheral flange 70 of the cover 62. The peripheral flange 68 and the peripheral flange 70 establish sealing surfaces for sealing the interface I between the tray 60 and the cover 62. A seal 72 may be positioned between the peripheral flanges 68, 70 to seal the interface I. The seal 72 may be a press-in-place seal, a foam seal, a room temperature vulcanizing seal, or any other type of seal suitable for sealing the interface I.

The hinged locking plate assemblies 64 may be arranged about portions of the peripheral flange 68 of the tray 60 and the peripheral flange 70 of the cover 62 to retain the cover 62 to the tray 60. When secured in place with one or more fasteners 74, the hinged locking plate assemblies 64 are configured to apply a clamping or compression force across the interface I. The clamping/compression force adequately compresses the seal 72, thereby providing a leak-proof joint at the interface I for blocking the ingress of moisture into the interior of the enclosure assembly 58.

Figure 4:
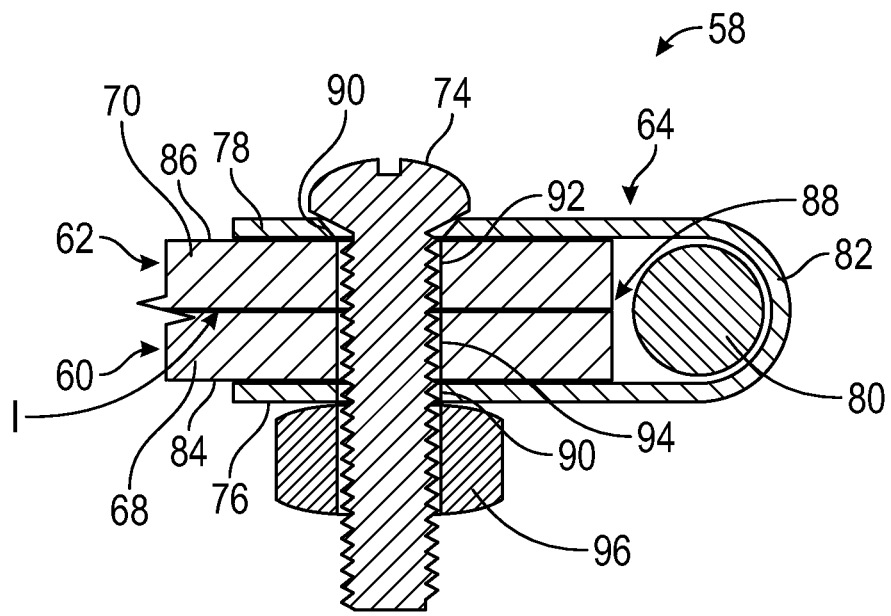
FIG. 4 is a cross-sectional view through section 4-4 of FIG. 3.
Figure 5:
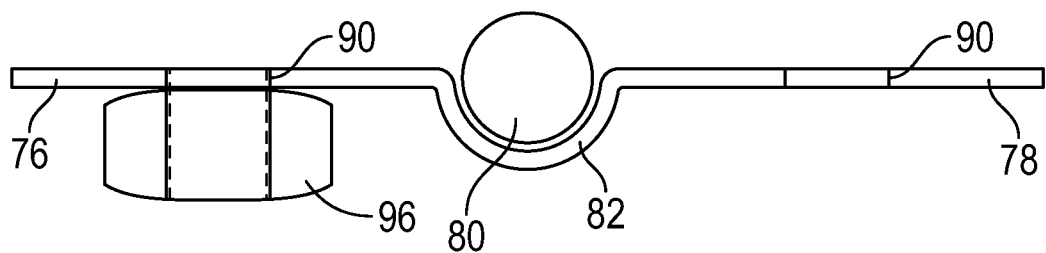
FIG. 5 illustrates an exemplary hinged locking plate assembly of the enclosure assembly of FIGS. 2-4.

Referring now primarily to FIGS. 4 and 5, each hinged locking plate assembly 64 may include a first plate 76, a second plate 78, and a hinge pin 80. The hinge pin 80 may be received within one or more captures 82 of each of the first plate 76 and the second plate 78 for movably securing the first and second plates 76, 78 relative to one another. For example, the second plate 78 may be rotated to various positions relative to the first plate 76 via the hinge pin 80.

When secured to the enclosure assembly 58, the first plate 76 of the hinged locking plate assembly 64 may be received against a bottom surface 84 of the peripheral flange 68 of the tray 60, and the second plate 78 may be received against a top surface 86 of the peripheral flange 70 of the cover 62. Moreover, the hinge pin 80 may be positioned outboard of an external seam 88 of the interface I when the hinged locking plate assembly 64 is secured to the enclosure assembly 58. Due to the increased coverage area provided by the hinged locking plate assembly 64, the interface I between the cover 62 and the tray 60 may be kept relatively tight and clean.

Each of the first plate 76 and the second plate 78 may include one or more attachment openings 90. Each attachment opening 90 is configured for receiving one of the fasteners 74. In an embodiment, two attachment openings 90 (and thus two fasteners 74) are provided in each plate 76, 78. In another embodiment, three attachment openings 90 (and thus three fasteners 74) are provided in each plate 76, 78. However, any amount of fasteners 74 and attachment openings 90 may be utilized for securing the hinged locking plate assembly 64 to the enclosure assembly 58, and thus the actual number of openings utilized may depend on design factors such as the size of the enclosure assembly 58 and a distance (e.g., hole pitch) between the attachment openings 90. The hinged locking plate assemblies 64 therefore allow for a larger hole size on the cover 62 and the tray 60 to reduce the likelihood of hole misalignment or hole shadowing issues.

One fastener 74 may be received through an attachment opening 90 of the second plate 78, through an opening 92 of the peripheral flange 70 of the cover 62, through an opening 94 of the peripheral flange 68 of the tray 60, and then through an attachment opening 90 of the first plate 76. The fastener 74 may be secured by a nut 96. In an embodiment, the nut 96 is an unthreaded weld nut that may be welded to the first plate 76. However, other configurations are also contemplated within the scope of this disclosure.

In an embodiment, the fasteners 74 are thread forming bolts or screws. However, other fastener configurations are further contemplated within the scope of this disclosure. The fasteners 74 are configured to extend across each of the first plate 76, the peripheral flange 70, the interface I, the peripheral flange 68, and the second plate 78 to provide the clamping load necessary for retention and for sealing at the perimeter of the enclosure assembly 58.

Figure 6:
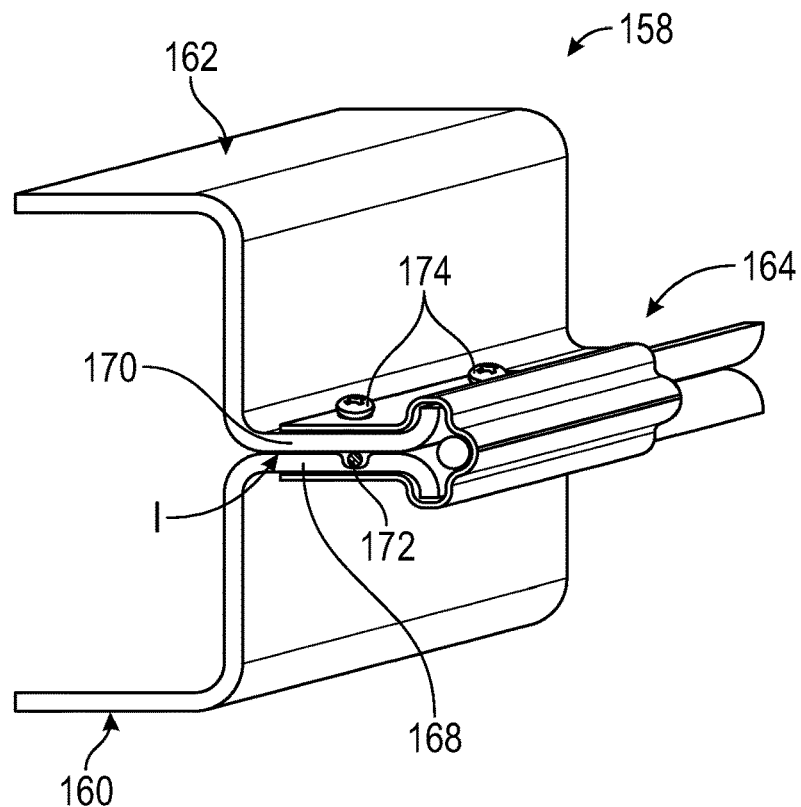
FIG. 6 illustrates another exemplary enclosure assembly for a traction battery pack.
Figure 7:
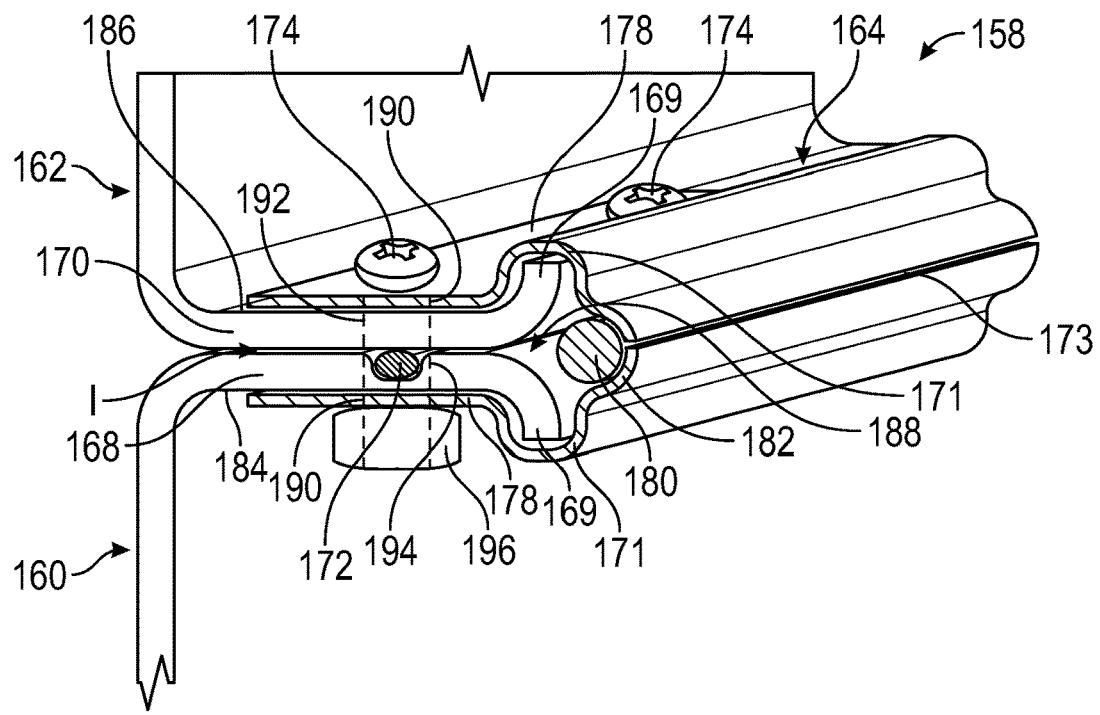
FIG. 7 is a partial sectional view of the enclosure assembly of FIG. 6.

FIGS. 6 and 7 illustrate another exemplary enclosure assembly 158 for a traction battery pack. The enclosure assembly 158 may include a tray 160, a lid or cover 162, and one or more hinged locking plate assemblies 164. The hinged locking plate assemblies 164 may be configured for retaining the cover 162 to the tray 160 and for maintaining a leak-free joint at an interface I between the tray 160 and the cover 162.

The interface I may extend between a peripheral flange 168 of the tray 160 and a peripheral flange 170 of the cover 162. The peripheral flange 168 and the peripheral flange 170 establish sealing surfaces for sealing the interface I between the tray 160 and the cover 162. A seal 172 may be positioned between the peripheral flanges 168, 170 to seal the interface I.

In this embodiment, the peripheral flanges 168, 170 each include a rolled edge 169. The rolled edge 169 may increase the stiffness about the outer perimeter of the enclosure assembly 158, for example.

Each hinged locking plate assembly 164 may be arranged about portions of the peripheral flange 168 of the tray 160 and the peripheral flange 170 of the cover 162 to retain the cover 162 to the tray 160. When secured with one or more fasteners 174, the hinged locking plate assemblies 164 are configured to apply a clamping or compression force across the interface I. The clamping/compression force adequately compresses the seal 172, thereby providing a leak-free joint at the interface I for blocking the ingress of moisture into the interior of the enclosure assembly 158.

Each hinged locking plate assembly 164 may include a first plate 176, a second plate 178, and a hinge pin 180. The hinge pin 180 may be received within one or more captures 182 of each of the first plate 176 and the second plate 178 for movably securing the first and second plates 176, 178 relative to one another. For example, the second plate 178 may be rotated to various positions relative to the first plate 176 via the hinge pin 180.

When secured to the enclosure assembly 158, the first plate 176 of the hinged locking plate assembly 164 may be received against a bottom surface 184 of the peripheral flange 168 of the tray 160, and the second plate 178 may be received against a top surface 186 of the peripheral flange 170 of the cover 162. Moreover, the hinge pin 180 may be positioned outboard of an external seam 188 of the interface I when the hinged locking plate assembly 164 is secured to the enclosure assembly 158.

Each of the first plate 176 and the second plate 178 may include a flared section 171. The flared sections 171 are configured to accommodate an increased dimension associated with the rolled edge 169 when the hinged locking plate assembly 164 is positioned about the peripheral flanges 168, 170.

In an embodiment, the hinged locking plate assembly 164 may additionally include a groove 173. The groove 173 may be provided in the vicinity of the hinge pin 180 and is configured to accommodate a clearance of the plates 176, 178 as the plates 176, 178 are rotated relative to one another.

Each of the plates 176, 178 may include one or more attachment openings 190. Each attachment opening 190 is configured for receiving one of the fasteners 174. One fastener 174 may be received through an attachment opening 190 of the second plate 178, through an opening 192 of the peripheral flange 170 of the cover 162, through an opening 194 of the peripheral flange 168 of the tray 160, and then through an attachment opening 190 of the first plate 176.

The fastener 174 may be secured by a nut 196. The nut 196 may be welded to the first plate 176, in an embodiment. However, other configurations are also contemplated within the scope of this disclosure. The fasteners 174 are configured to extend across the first and second plates 176, 178 and across the peripheral flanges 168, 170 to provide the clamping load necessary for retention and sealing at the perimeter of the enclosure assembly 158.

Figure 8:
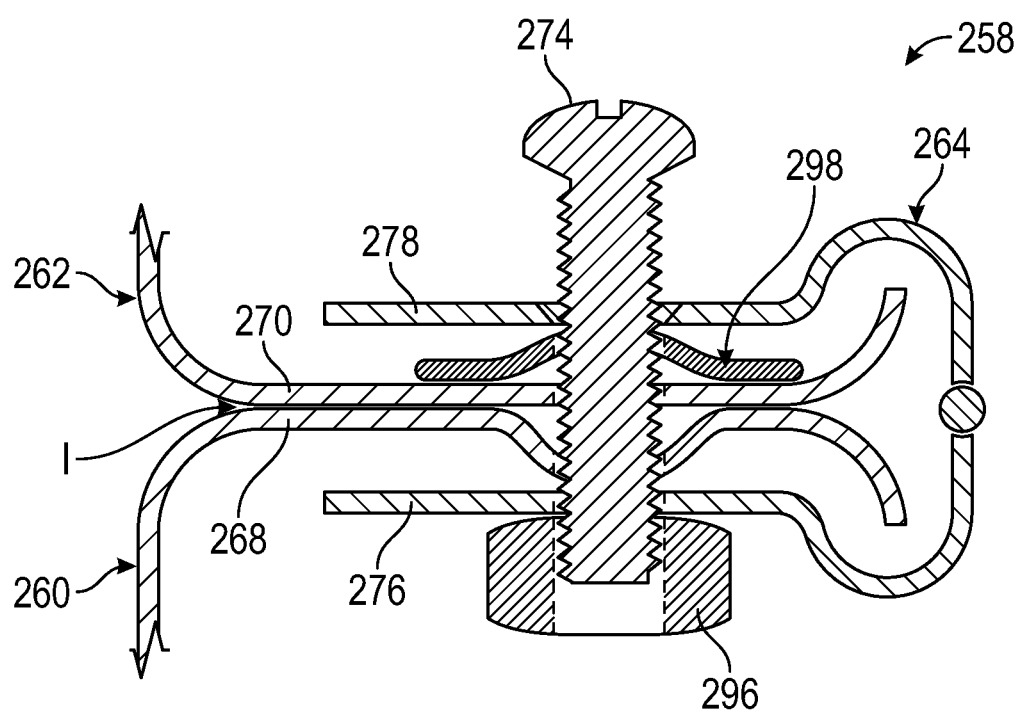
FIG. 8 illustrates select portions of another exemplary enclosure assembly.

FIG. 8 illustrates yet another exemplary enclosure assembly 258 for a traction battery pack. The enclosure assembly 258 is similar to the enclosure assembly 158 discussed above and includes a tray 260, a lid or cover 262, and one or more hinged locking plate assemblies 264 that are configured for retaining the cover 262 to the tray 260 and for maintaining a leak-proof joint at an interface I between the tray 260 and the cover 262. However, in this embodiment, the enclosure design further incorporates a pressure plate 298.

The pressure plate 298 may be configured to exert an added compressive pressure at the interface I between a peripheral flange 268 of the tray 260 and a peripheral flange 270 of the cover 262. In an embodiment, the pressure plate 298 is positioned between a second plate 278 of the hinged locking plate assembly 264 and the peripheral flange 270 of the cover 262. However, other positions for the pressure plate 298 may also be suitable within the scope of this disclosure.

The compression afforded by the hinged locking plate assembly 264 may be achieved via one or more fasteners 274. The fasteners 274 may be inserted through a first plate 276 of the hinged locking plate assembly 264, the second plate 278, the pressure plate 298, and the peripheral flanges 268, 270. The fasteners 274 may be secured by a nut 296.

The exemplary traction battery packs of this disclosure incorporate hinged locking plate assemblies for securing and sealing the interface between a cover and tray of an outer enclosure assembly of the traction battery pack. The hinged locking plate assemblies are effective for reducing or even eliminating assembly related issues associated with dimensional variations and hole misalignment, thereby reducing assembly complexity. The hinged locking plate assemblies of this disclosure provide further advantages over known enclosure attachment solutions including but not limited to allowing for the use of larger hole sizes on the cover and the tray, reducing part rework, reducing clamping stress on the cover and/or the tray by increasing fastener bearing area and strength, reducing fastener usage, and reducing battery pack servicing complexity.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A traction battery pack, comprising:
a tray including a first peripheral flange;
a cover including a second peripheral flange; and
a hinged locking plate assembly arranged to retain the second peripheral flange to the first peripheral flange, wherein the hinged locking plate assembly includes a first plate, a second plate, and a hinge pin configured to movably connect the second plate to the first plate.

2. The traction battery pack as recited in claim 1, wherein the first plate is received against a bottom surface of the first peripheral flange and the second plate is received against a top surface of the second peripheral flange.

3. The traction battery pack as recited in claim 2, comprising a fastener received through the second plate, the second peripheral flange, the first peripheral flange, and the first plate, whereby the hinged locking plate assembly is configured to apply a clamping force across an interface between the first peripheral flange and the second peripheral flange.

4. The traction battery pack as recited in claim 3, wherein the fastener is secured in place by a weld nut.

5. The traction battery pack as recited in claim 3, wherein the clamping force is applied across a seal that is positioned at the interface.

6. The traction battery pack as recited in claim 1, wherein the first plate and the second plate each include a flared section that is configured to accommodate a rolled edge of the first peripheral flange or the second peripheral flange.

7. The traction battery pack as recited in claim 6, wherein the hinged locking plate assembly includes a groove located in the vicinity of the hinge pin.

8. The traction battery pack as recited in claim 1, wherein the tray and the cover establish an enclosure assembly, and comprising a battery array housed inside the enclosure assembly.

9. The traction battery pack as recited in claim 1, wherein a majority of a surface area of each of the first plate and the second plate provides a flat surface configured for interfacing with a corresponding flat surface of either the first peripheral flange or the second peripheral flange.

10. A traction battery pack, comprising:
an enclosure assembly including a tray, a cover, and a hinged locking plate assembly adapted to both retain the cover to the tray and seal an interface between the cover and the tray; and
a battery array housed within the enclosure assembly,
wherein the hinged locking plate assembly includes a first plate, a second plate, and a hinge pin configured to permit one of the first plate or the second plate to rotate relative to the other of the first plate or the second plate.

11. The traction battery pack as recited in claim 10, wherein the interface is located between a first peripheral flange of the tray and a second peripheral flange of the cover.

12. The traction battery pack as recited in claim 10, wherein the first plate is received against a bottom surface of a first peripheral flange of the tray, and the second plate is received against a top surface of a second peripheral flange of the cover.

13. The traction battery pack as recited in claim 12, comprising a fastener received through the second plate, the second peripheral flange, the first peripheral flange, and the first plate, whereby the hinged locking plate assembly is configured to apply a clamping force across the interface.

14. The traction battery pack as recited in claim 13, wherein the fastener is secured in place by a weld nut that is secured to the first plate.

15. The traction battery pack as recited in claim 13, wherein the clamping force is applied across a seal that is positioned at the interface.

16. The traction battery pack as recited in claim 12, wherein the first plate or the second plate includes a flared section that is configured to accommodate a rolled edge of the first peripheral flange or the second peripheral flange.

17. The traction battery pack as recited in claim 10, wherein the hinged locking plate assembly includes a groove located in the vicinity of the hinge pin.

18. A traction battery pack, comprising:
a tray including a first peripheral flange;
a cover including a second peripheral flange; and
a hinged locking plate assembly including a first plate received against a bottom surface of the first peripheral flange, a second plate received against a top surface of the second peripheral flange, a hinge pin configured to movably connect the second plate to the first plate, and a fastener received through the second plate, the second peripheral flange, the first peripheral flange, and the first plate,
wherein the hinged locking plate assembly is configured to apply a clamping force across an interface between the first peripheral flange and the second peripheral flange.

* * * * *